United States Patent [19]

Gaertner

[11] Patent Number: 5,509,547

[45] Date of Patent: Apr. 23, 1996

[54] COUPLING DEVICE

[76] Inventor: Franz Gaertner, Muehlweg 10, 97656 Unterelsbach, Germany

[21] Appl. No.: 309,036

[22] Filed: Sep. 20, 1994

[30] Foreign Application Priority Data

Sep. 21, 1993 [DE] Germany .................... 43 82 072.4

[51] Int. Cl.$^6$ .................................................. B65G 9/00
[52] U.S. Cl. ........................................ 213/75 R; 213/77
[58] Field of Search ........................... 213/75 R, 100 R, 213/77, 104, 100 W; 198/465.4

[56] References Cited

U.S. PATENT DOCUMENTS

| 1,397,781 | 11/1921 | Reif ........................... 213/104 |
| 1,591,789 | 7/1926 | Smith ...................... 213/100 R |
| 2,184,103 | 12/1939 | Rydin ......................... 213/104 |
| 2,235,555 | 3/1941 | Kock ........................... 213/104 |
| 3,854,599 | 12/1974 | Day et al. ................ 213/100 R |
| 5,014,864 | 5/1991 | Richter et al. .............. 213/104 |
| 5,209,363 | 5/1993 | Enderlein ................. 213/75 R |
| 5,316,158 | 5/1994 | Dunham et al. ........... 213/104 |

FOREIGN PATENT DOCUMENTS 0991448  5/1965  United Kingdom ................ 213/75 R

*Primary Examiner*—Mark T. Le
*Attorney, Agent, or Firm*—Jones & Askew

[57] ABSTRACT

The invention pertains to a coupling device for a conveyor device which in particular is used for the suspended transport of clothing in the garment industry, whereby the conveyor device comprises a support rail which is suspended on a runner or a similar element, and whereby stay pipes (7) are arranged as holding devices in a movable fashion on said support rail via support straps (15). According to the invention, adjacent stay pipes (7) may be connected to each other selectively by coupling elements (1,2) that may engage each other. A blocking device (20,21) is provided for selectively blocking and releasing the coupling connection between adjacent stay pipes (7), whereby the blocking device comprises a blocking block (22) which is connected to the end of the stay pipe and assigned to the respective coupling element (1,2), and the blocking block may be pivoted between a blocking position and a release position in which the coupling engagement is not prevented.

7 Claims, 3 Drawing Sheets

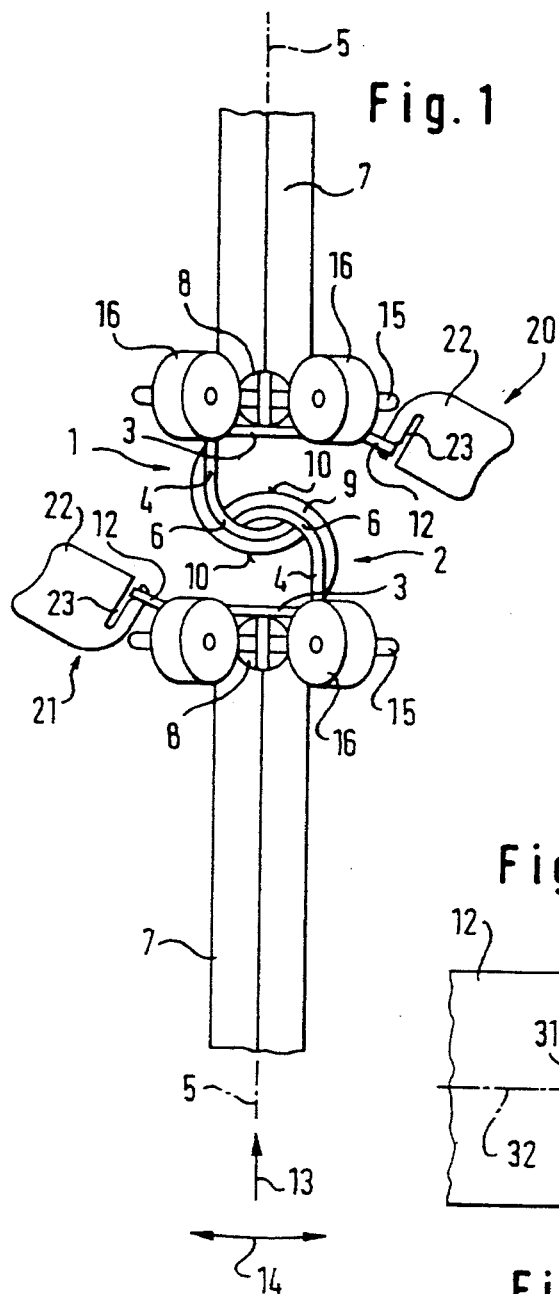
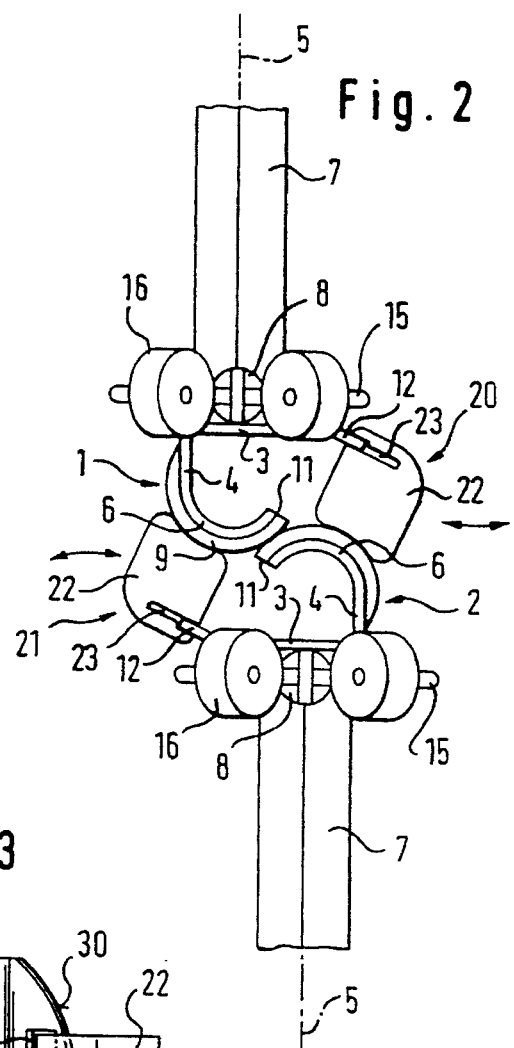
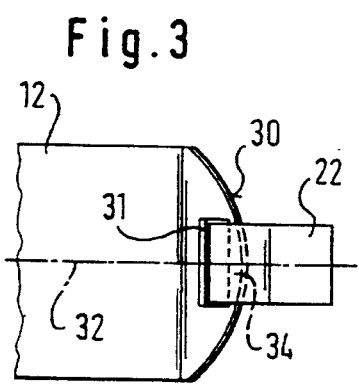
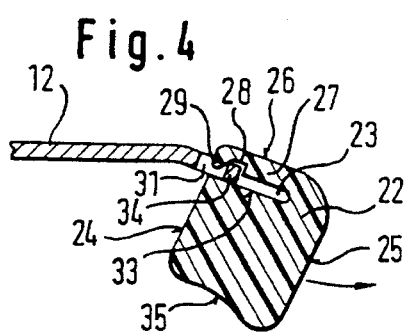

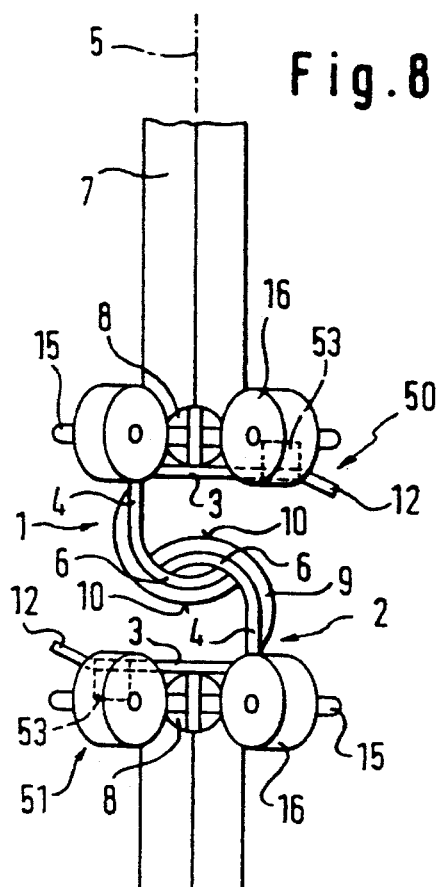
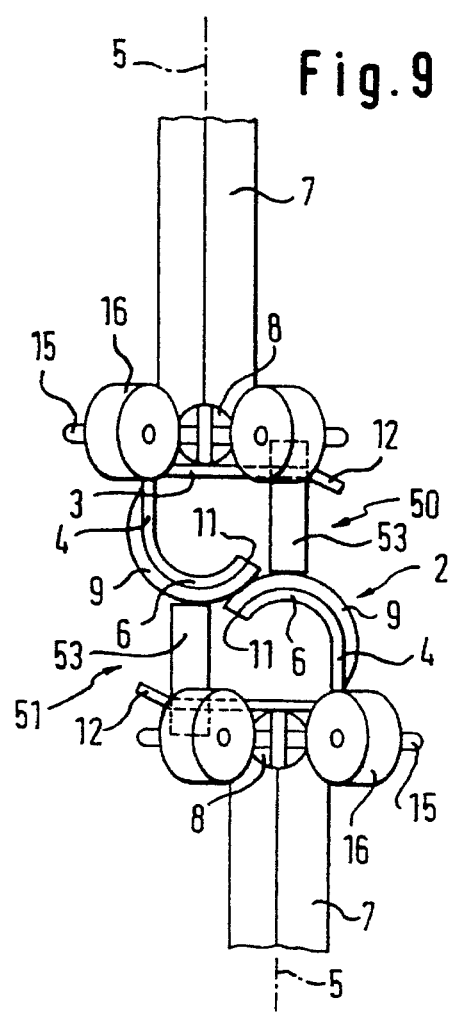
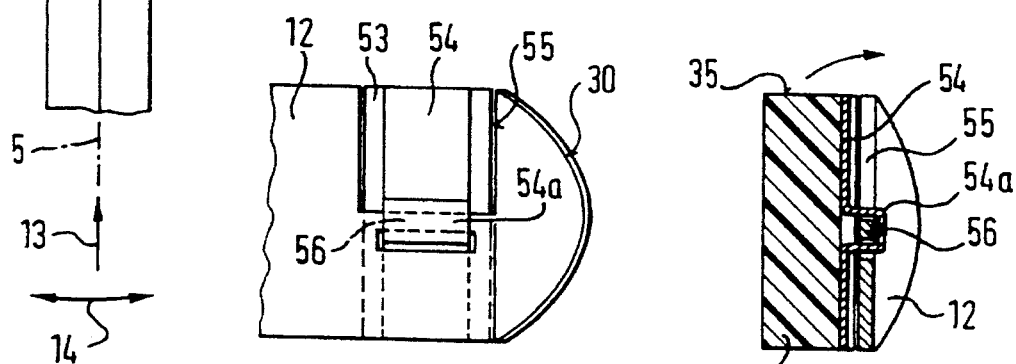
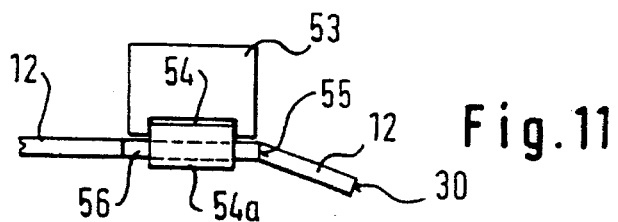

COUPLING DEVICE

The invention pertains to a coupling device for a conveyor used for the suspended transport of clothing in the garment industry.

BACKGROUND OF THE INVENTION

One coupling device of this type is disclosed in German Patent No. 3,318,381 C2. This particular coupling device is essentially characterized by the fact that the coupling elements consist of thin, strip-shaped material, and that said coupling elements are provided with a forward extending support web as well as an arched web which adjoins the aforementioned support web, whereby the arc of the arched web is directed inward towards the longitudinal axis of a stay pipe, and the maximum of the curve is positioned between the axis and the support web. Thus, the coupling elements are arranged in mirror image fashion on the stay pipes of the hoisting elements to be coupled to each other, and the respective maxima of the curves of the coupling elements are arranged laterally offset to each other. Each of the arched webs preferably is constructed in spherical fashion.

This known coupling device has proven itself in numerous practical applications.

The invention is based on the objective to design this known coupling device in such a way that coupling to another conveyor device can be optionally prevented.

BRIEF DESCRIPTION OF THE DRAWINGS

The invention is described in detail below with the aid of the figures. The figures show:

FIG. 1: a top view of a first embodiment of the coupling device according to the invention in coupled state;

FIG. 2: a top view of the first embodiment of the coupling device according to the invention in the blocked state;

FIG. 3: a front view of the blocking device of the first embodiment of the coupling device according to the invention;

FIG. 4: a longitudinal section through the blocking device according to FIG. 3;

FIG. 8: a top view of an additional embodiment of the coupling device according to the invention in the coupled state;

FIG. 9: a top view of the additional embodiment of the coupling device according to the invention in the blocked state;

FIG. 10: a front view of the blocking device of the additional embodiment of the coupling device according to the invention;

FIG. 11: a top view of the blocking device according to FIG. 10, and

FIG. 12: a cross section through the blocking device according to FIG. 10.

DETAILED DESCRIPTION OF PREFERRED EMBODIMENTS

Figure 5:
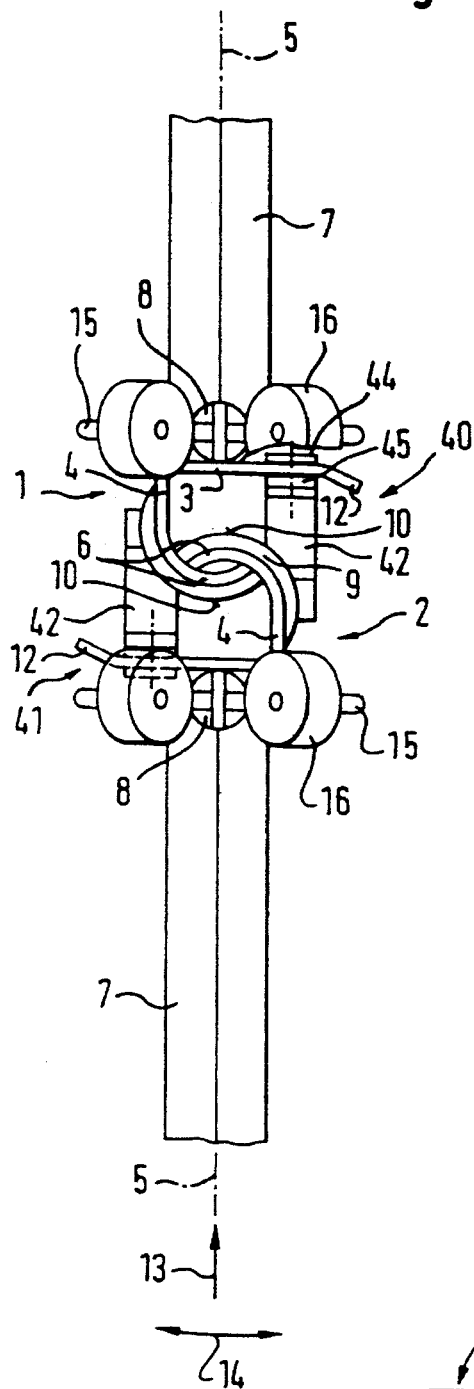
FIG. 5: a top view of a second embodiment of the coupling device according to the invention in the coupled state.

The new coupling device consists of two relatively wide, hook-shaped coupling elements 1 and 2 which are constructed identically in the shape of a sheet metal strip and—viewed from the top—consist of a planar bottom web 3, a support web 4 which is bent perpendicular towards the front and an arched coupling web 6 which is situated adjacent to the aforementioned support web and bent inward toward the longitudinal axis of a stay pipe 7. The coupling element 1,2 is fastened in front to a stay pipe 7 with the bottom web 3, whereby said stay pipe is suspended on a V-shaped support strap 15 with connecting means 8 such that it may be pivoted towards the front, the back and the side. On each free end of the V-shaped support strap 15 a roller 16 is arranged so that it can rotate. The stay pipe 7, the support strap 15 with the rollers 16 as well as the connecting elements 8 form a conveyor device which, in particular, can be used for the suspended transport of clothing in the garment industry. The conveyor device comprises a support rail which is suspended from a runner or a similar element, and the support straps 15 which are equipped with the rollers 16 are suspended from the aforementioned support rail, whereby the rollers 16 brace themselves on the support rail, the support straps 15 hang, and the support strap 15 carries the stay pipe 7 or a similar holding device, and whereby the coupling elements 1,2 which can engage each other are arranged between adjacent stay pipe ends (see, e.g., German Patent No. 1,940,256).

The coupling elements 1 and 2 are constructed as wide as the diameter and/or thickness of the stay pipe 7. The coupling elements are preferably at least sufficiently wide to form an appropriate running and/or sliding surface.

It is practical that the radius of the arched coupling web 6 be smaller than the width of the bottom web 3 and the maximum of the curve 10 of the arched web 6 be arranged between the longitudinal axis 5 and the support web 4, i.e., off-center. Thus, the radius is smaller than half the width, whereby the arched web 6 forms a part of this circle. Consequently, the central point of the arc of the arched web 6 is also arranged off-center. The free end edge 11 of the arched web 6 is bent toward the bottom web 3 approximately to such an extent that the arched web 6—as shown—forms a semicircular arc. Viewed from the side, the free end edge 11 is constructed in the shape of an arc, whereby the arc of this edge 11 is adapted to the arc of the dome shape resulting from the spherical construction of the arched web 6.

The length of the support web 4 and the arc 9 of the arched web 6 are dimensioned in such a way to insure that a distance exists between the maximum of the curve 10 and the bottom web 3, whereby said distance is sufficient to push the arched web 6 of the other coupling element through the opening from the side.

At the end of the bottom web 3, which is situated opposite the support web 4, is arranged a transversely and outwardly directed sliding web 12, whereby an opening through which the arched web 6 of a different coupling element 2 may be inserted remains between the arc 9 and the sliding web 12.

The coupling elements 1 and 2 are arranged in mirror image fashion on the stay pipes of the conveyor devices to be coupled to each other, whereby the longitudinal axes 5 of the stay pipes 7 are aligned with respect to each other if the conveyor devices are suspended on a linear support rail. Consequently, the respective maxima of the curves 10 are offset laterally with respect to each other, but the two arcs 9 come in contact with each other if the stay pipe 7 is, for example, displaced in the direction of the arrow 13. Thus, the outer surfaces of the arcs 9 may slide past each other. Since the stay pipes 7 are suspended in swinging fashion, they may yield laterally in the direction of the double arrow 14 and reassume their starting positions in which their axes are aligned after the arcs have settled into their normal swinging movements.

The distance between the connecting elements 8 in the coupled state of the stay pipes 7 is chosen such that the maxima of the curves 10 of adjacent coupling elements 1 and 2 overlap each other in the direction of the longitudinal axis 5 when the conveyor device is at a standstill.

The radius of the arched web 6 is chosen such that the edges 11 of the arched webs 6 may slide positively along the inner surfaces of the arched webs 6 without engaging when the conveyor device is pulled through the curves of the transport path. The radius and the length of the arcs 9 additionally are adapted to each other in such a way that the edge 11 may not engage the corner between the bottom web 3 and the support web 4 when moving through curves during the pushing transport of the conveyor device when the arched web 6 of the coupling element 1 impacts the bottom web 3 of the opposite coupling element 2. In addition, the radius of curvature of the edges 11 is chosen such that the edges 11 may slide positively on the respective inner surface of the arched web 6 of the adjacent coupling element on ascending or descending gradients. To that extent, the coupling elements 1 and 2 cooperate like hinges with a broad range of movability when the stay pipes 7 are swung horizontally and vertically.

The coupling elements 1,2 preferably are manufactured from a resilient sheet steel or plastic such that the webs 4 and 6 may act as a resilient and/or elastic buffer when two coupling elements come into contact with each other. The sliding web 12 prevents the opposite coupling element from swinging excessively outward during the coupling process. This is the reason why the length of the sliding web is chosen such that the arched web 6 is already turned against said sliding web 12 once the arcs have come into contact with each other. The arched web 6 is preferably constructed in a spherical fashion such that a particularly low frictional resistance between the arcs 9 and 11 which slide on each other is attained. The support web 4 preferably extends parallel to the longitudinal axis 5. The coupling elements 1 and 2 must be provided with the support web 4 and the arched web 6; however, the bottom web 3 may be omitted if a different arrangement for fastening the coupling elements 1,2 onto the stay pipes is provided.

The coupling device according to the invention comprises a blocking device which may be turned between a position in which coupling is facilitated and a position in which coupling is prevented. In the latter position, the engagement of the coupling elements 1,2 of two adjacent conveyor devices is effectively prevented.

According to a first embodiment which is illustrated in FIGS. 1 through 4, the blocking device 20,21 according to the invention is provided with a blocking block 22 which, for example, consists of plastic and is linked to the free end of the sliding web 12. In the blocking block 22 is arranged a groove 23 which exits into a surface 24 of the blocking block 22, extends up to the vicinity of the opposite surface 25 of the block 22 and is situated in the vicinity of a surface 26 of the block 22 which connects the two surfaces 24 and 25 to each other in such a way that a lever arm 27 is formed by the groove 23 arranged in the block. The lever arm is firmly connected to the remaining portion of the block 22 within the region of the bottom of the groove 23. The lever arm 27 is penetrated by a groove 28 in the vicinity of the location at which the groove 23 exits into the surface 24, whereby the initially mentioned groove extends perpendicular to the groove 23, exits into it and defines a tab or rail 29 at the free end of the lever arm 27. The groove 28 is constructed with an essentially U-shaped cross section, whereby the side wall of the groove 28 which adjoins the tab 29 and/or the inner side of the tab 29 extends transverse towards the outer face side of the tab 29.

In the free end of the sliding web 12 is provided a recess 31 which is arranged in the vicinity of the outer edge 30 of the sliding web. The rectangular recess 31 extends with its long sides perpendicular to the central longitudinal axis 32 of the sliding web 12 by which both longitudinal sides of the rectangle are penetrated centrally. The block 22 is attached to the free end of the sliding web 12 in such a way that the tab 29 engages the recess 31 of the lever arm 27, while the web section 34, situated between the recess 31 of the sliding web and the outer edge 30 of the sliding web, is engaged in clamping fashion with the transverse groove 28 of the blocking element and the section of the side wall 33 of the groove 25 in the blocking element which is situated opposite the aforementioned transverse groove. This clamping engagement is characterized by two stable positions of the blocking element 22 on the sliding web 12, whereby one position is illustrated in FIG. 1, and the other position is illustrated in FIGS. 2 through 4. Between these two positions, the blocking element 22 may be adjusted in a turning fashion about an axis which extends perpendicular to the central longitudinal axis 32 and penetrates the web section 34, and both stable positions are characterized by a snap-in engagement of the clamping connection. The snap-in engagement of the block 22 into the respective end position is realized in that the square web section 34 can snap into the transverse groove 28 in two positions of the block 22 that are offset by 90° and during this process engage two-dimensionally the bottom of this transverse groove 28.

In the blocked position illustrated in FIGS. 2 through 4, the blocking block 22 is situated laterally next to the respective coupling element 1,2 in such a way that the coupling element of the adjacent conveyor device makes impact with its arched coupling web 6 against an impact surface 35 of the blocking element 22 before this coupling element may engage the other coupling element from behind. A coupling between two adjacent conveyor devices is effectively prevented in this fashion. In the other instance, the previously described coupling process may be carried out in the position of the blocking elements 22 illustrated in FIG. 1 in which the coupling elements are situated laterally next to the sliding strap 15 behind the sliding element 12 with respect to the adjacent coupling element.

Figure 6:
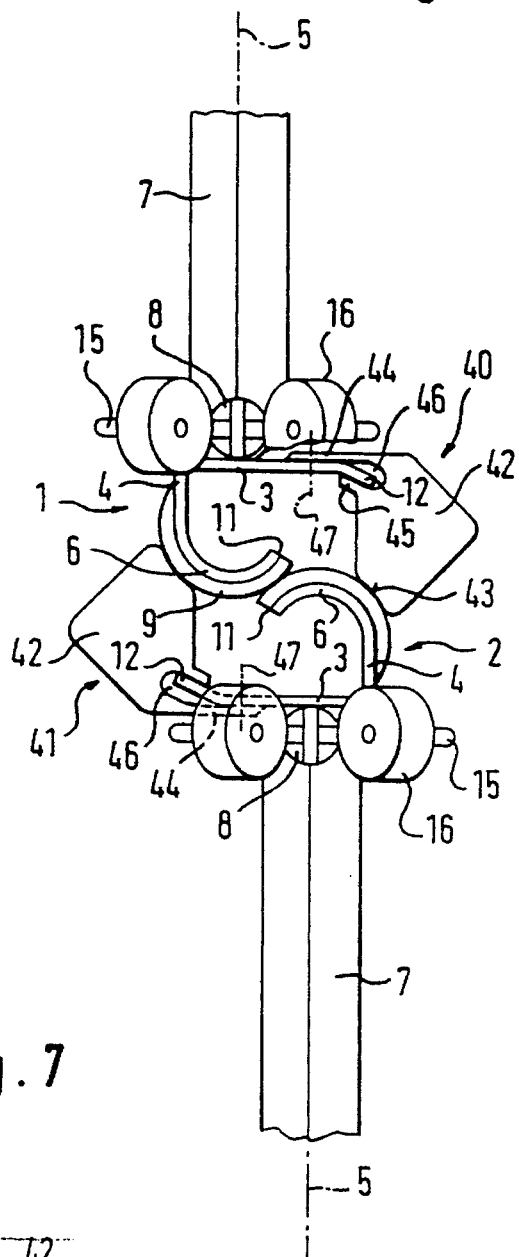
FIG. 6: a top view of the second embodiment of the coupling device according to the invention in the blocked state.
Figure 7:
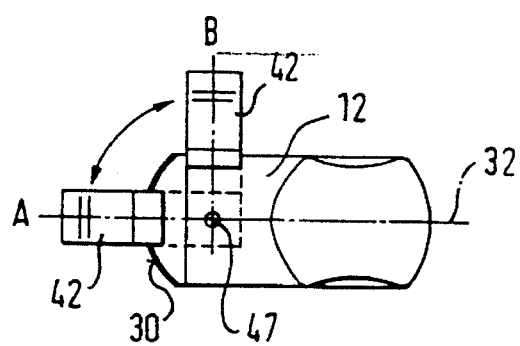
FIG. 7: a front view of the blocking device of the second embodiment of the coupling device according to the invention.

One additional embodiment of the blocking device is illustrated in FIGS. 5 through 7 in which components which correspond to the embodiments according to FIGS. 1 through 4 are not identified by identical reference numerals so as to provide a better overview.

The blocking device 40,41 consists of a blocking block 42 which may be adjusted between a blocking position in which it hits up against the arched web 6 of the adjacent coupling element 1,2 with its blocking surface 43 that is adapted to the contour of the arched coupling web 6 before it hits up against the coupling element to which the blocking element 42 is assigned and before reaching a swinging position in which the coupling process may be carried out.

The coupling block 42 has a laterally projecting arm 44 which is constructed integrally with the block 42 and extends in planar fashion, as well as a shorter arm 45 which is situated opposite the arm 44 and which is also constructed integrally with the block 42. The arms 44 and 45 encompass a groove 46 which extends in a linear fashion. The block 42 is attached to the sliding web 12 in turning fashion by means of the arm 44. For this purpose, the free end of the arm 44 is provided with a hole which is penetrated by a shaft 47 that is inserted into a hole of the sliding web 12. The inner surface of the arm 44 is in contact with a planar surface region of the sliding web 12, the arched outer edge 30 of which is bent from the planar surface section towards the free end edge 11 of the arched web of the coupling element 1,2, i.e., similar to the tip of a ski.

The bending of the edge section of the sliding web 12 with respect to the planar section of the sliding web and/or the planar blocking element arm 44 as well as the angular alignment of the arm 45 on the turning arm 44 are selected in such a way that the bent end section of the sliding web adjoins the inner side of the arm 45 without stress or almost without stress if the blocking block 42 assumes its blocking position illustrated in FIG. 6 and/or the position A in FIG. 7 in which it is aligned parallel to the central longitudinal axis 32 of the sliding web 12. In order to turn the blocking element 42 out from this position, a force which increases as the turning movement continues is required. This force is generated due to the fact that the blocking element arm 45 is increasingly pressed against the bent end section of the sliding web 12, and that said blocking element arm is able to yield to this pressure up to a certain degree due to its elastic construction until it finally is disengaged from the bent end section of the sliding web once the blocking element 42 assumes its standby position illustrated in FIG. 5 and/or the position identified by the reference symbol B in FIG. 7. The stable end positions A and B which represent the blocked position and the standby position for the coupling process are also realized by means of a snap-in process in this embodiment of the blocking device, i.e., by releasing the arm 45 from the bent end of the sliding element and by relieving the arm 45 once the zenith of the arc 30 has been reached.

The contact between the short blocking element arm 45 and the bent end of the sliding web exerts a force onto the long blocking element arm 44 which presses its end outward in the direction of the axis of rotation 47, i.e., away from the sliding web. This force which impairs the turning connection of the holding arm web 44 may, for example, be compensated for by means of a pressure spring which engages on the web 44 at the side situated opposite to the sliding web 12 in the axis of rotation 47.

A third embodiment of the blocking device for the coupling device according to the invention is illustrated in FIGS. 8 through 12. Here, the reference numerals also are omitted insofar as this embodiment corresponds with the embodiments described previously.

This blocking device 50,51 is also constructed as a snap-in device which reaches its stable end positions, i.e., the position in which coupling is prevented and the position in which coupling is facilitated, by means of a snap-in process.

The blocking device 50,51 is provided with a rectangular blocking body 53 which preferably consists of an elastic material so as to insure soft impact between the respective coupling elements. Alternatively, the blocking body may consist of a steel material and be provided with an elastic coating on its impact surface which engages the respective coupling element.

The blocking element 53 is provided with a spring band 54 on one flat side, whereby said spring band is connected firmly to the blocking element 53 and provided with a U-shaped central region 54a which projects from the blocking element 53 and serves for fastening the blocking element 53 onto the sliding web 12 in turning fashion. Within the region of its free end, the sliding web 12 is provided with a rectangular recess 55 which exits into one lateral edge of the sliding web 12 and extends up to the central longitudinal axis of the sliding web 12 as well as into it. At a distance from the inner edge of the recess is situated a transverse web 56 which extends parallel to the longitudinal center 32 of the sliding web 12 and has a rectangular, preferably square, cross section that serves as a pivot attachment for the blocking element 53 and penetrates the U-shaped section 54a of the spring 54 on the blocking element 53. The blocking element 53 is slightly smaller than the width of the recess 55, so that the blocking element 53 may be adjusted in pivoting fashion between a position in which it is situated on the rear side of the sliding web 12 (FIG. 12), i.e., the standby position, and a position in which it is situated on the side of the sliding web 12 situated on the coupling device opposing the coupling element 1,2 offset by 90° (FIG. 9). The blocking element snaps into its two positions due to the fact that the central U-shaped spring section 54a encompasses the pivoting shaft 56 positively in these positions and/or is engaged with the linear edges of the axis 56 with its linear sections.

What is claimed is:

1. Coupling device for a conveyor device which in particular is used for suspended transport of clothing, whereby the conveyor device comprises a support rail that is suspended and on which are suspended support straps that are equipped with rollers and whereby the rollers brace themselves on a support rail and the support straps hang, and whereby the support straps carry stay pipes having a longitudinal axis (5) and are arranged between adjacent stay pipe ends which may engage each other, comprising:

coupling elements (1,2) each of which comprising a strip-shaped thin material and provided with a forward extending support web (4) and an arched web (6) which is located adjacent the support web (4), whereby the arched web (6) has an arc that is directed inward towards the axis (5) and a curve (10) whose maximum is positioned between the axis (5) and the support web (4);

blocking devices (20,21,40,41,50,51) for selectively blocking a coupling connection between the coupling elements adapted for mounting on adjacent stay pipes (7), each said blocking device including a blocking block (22,42,53) which is adapted for mounting on one of said adjacent stay pipes and assigned to block one of said coupling elements (1,2) adapted for mounting on the other one of said adjacent stay pipes (7), whereby each said blocking block (22,42,53) includes a blocking position in which when the adjacent stay pipes (7) approaches each other for engagement, said blocking block would impact against said one of said coupling elements (1,2) before any coupling engagement would occur between the coupling elements, and a release position in which the blocking block (22,42,53) does not engage any one of said coupling elements (1,2) when the adjacent stay pipes approach each other for engagement; and the blocking blocks (22,42,53) are constructed to snap into their blocking and release positions.

2. Coupling device according to claim 1 characterized by the fact that the contour of the blocking surface (34) is adapted to the outer contour of the arched web (6).

3. Coupling device according to claim 1, characterized by the fact that the blocking block (42,42,53) is linked to a holding arm (12) which is adapted to project laterally from an end of the stay pipe.

4. Coupling device according to claim 3, wherein said holding arm (12) is a sliding web provided at an end of a bottom web (3) located adjacent said support web (4), said sliding web being arranged relative to said arched web (6) so as to leave an opening for the coupling connection of the coupling elements.

5. Coupling device according to claim 1, characterized by the fact that a groove (23) is arranged laterally in the blocking block (20) such that the groove forms a lever arm (27), that on a free end of the lever arm (27) is provided a transverse groove 28 with a substantially U-shaped cross section which is opened towards an opposite side wall of the groove (23), and that on a free end of a blocking block holding arm (12) is provided a pivot attachment which is constructed in the shape of a square and engages in a clamping fashion between the transverse groove (28) and said opposite side wall of the groove (23).

6. Coupling device according to claim 3, characterized by the fact that the blocking block (42) is linked in pivoting fashion to the holding arm (12) via a resilient holding arm web (44), whereby said holding arm engages an end section that extends at an angle to a pivoting plane of the holding arm web (44) into a groove of the blocking block (42) which extends transverse to the holding arm web (44) at an end of the holding arm web (44) situated on a side of the blocking block, and that said holding arm is provided with a circular, bent outer edge with an arched center that is offset relative to a pivoting center of the holding arm webb (44) in such a way that the end section is guided in the groove with minimal stress once the end section is aligned towards the zenith of the circular bent edge, and that a release position of the blocking device is defined by a position of the holding arm web laterally next to the circular bent edge.

7. Coupling device according to claim 3, characterized by the fact that the blocking block (53) has a rectangular shape and is arranged on a square rotating shaft (56) of the holding arm (12) via a spring band (54) with a U-shaped central portion (54a), whereby said square rotating shaft is arranged within a recess (55) of the holding arm (12) by means of which the blocking block (53) may be pivoted between two positions to both sides of the holding arm in which a central part (54a) of the spring band is clamped around the square rotating shaft (56) in positive fashion.

* * * * *

UNITED STATES PATENT AND TRADEMARK OFFICE
CERTIFICATE OF CORRECTION

PATENT NO.  : 5,509,547
DATED       : April 23, 1996
INVENTOR(S) : Franz Gaertner It is certified that error appears in the above-identified patent and that said Letters Patent is hereby corrected as shown below:

Title page, item "[30] Foreign Application Priority Data", the serial number of the German application should be --43 32 072.4--.

In Col. 8, line 7, "webb" should be --web--.

Signed and Sealed this

Tenth Day of September, 1996

Attest:

BRUCE LEHMAN

Attesting Officer    Commissioner of Patents and Trademarks